June 27, 1944.  C. F. SHEPARD  2,352,500
DEVICE FOR TESTING VISUAL ACUITY
Filed March 19, 1942
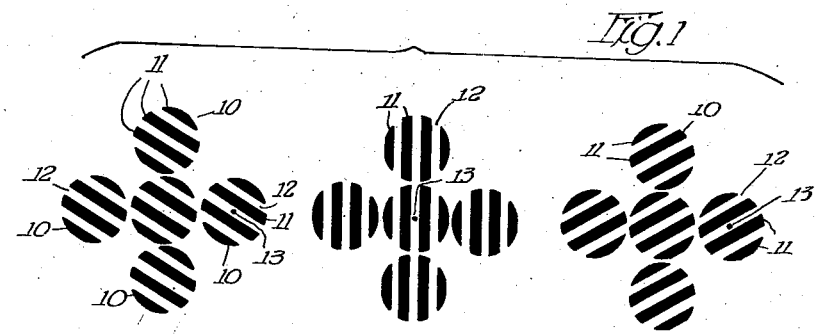
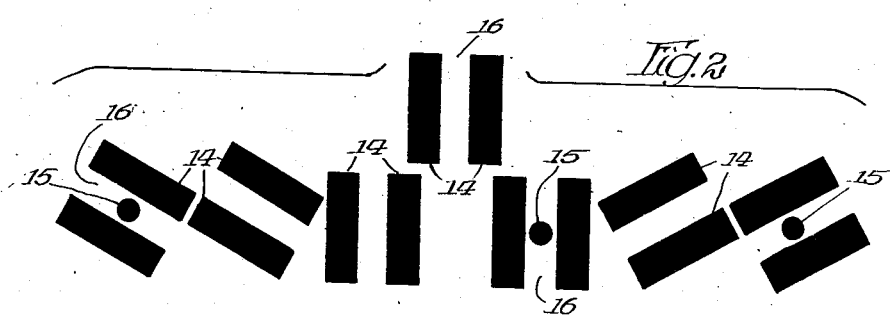
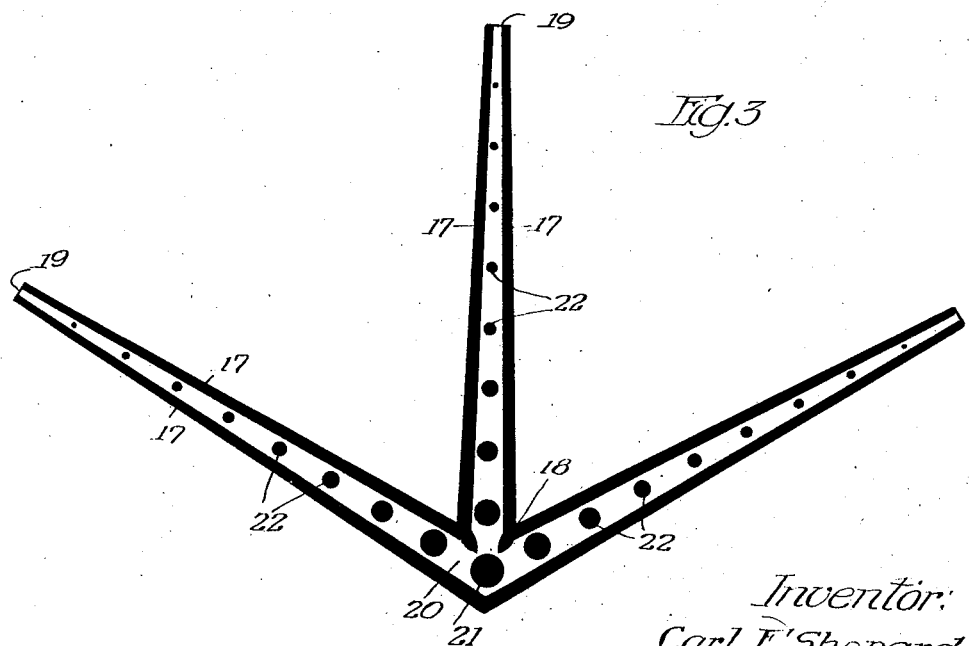
Inventor:
Carl F. Shepard Patented June 27, 1944

2,352,500

UNITED STATES PATENT OFFICE 2,352,500

DEVICE FOR TESTING VISUAL ACUITY

Carl F. Shepard, Chicago, Ill., assignor to Northern Illinois College of Optometry, Chicago, Ill., a corporation of Illinois Application March 19, 1942, Serial No. 435,334

5 Claims. (Cl. 88—20)

This invention relates to improvements in means for discerning the presence of ametropia (any so-called error of refraction) in the eye that is the cause of poor vision.

The usual method of measuring vision, or visual acuity, consists of either the use of a series of characters of graded sizes presented at a predetermined distance, or the employment of characters of predetermined size or sizes first presented to the subject at a distance so great that they cannot be recognized, and then gradually reducing the distance between the characters and the eye until the characters can be recognized or distinguished by the subject.

The accepted standard of vision measurement by either of these two procedures is in terms of the angle subtend by just recognizable characters drawn to a pattern designed originally by Snellen, and consists, generally, of a large square composed of a number of smaller squares (approximately 25), the characters being formed by filling in certain of the smaller squares to form letters of the alphabet or numerals, etc. Each such character is so formed that no stroke or bar, or part of any character, is greater in width than one small square, and no two strokes, bars, or parts of the character approaching any other, closer than the width of one of the small squares.

The illiterate E has also been employed for making tests, but cannot be employed for the purpose of the present invention, because when attempted to be so used there is presented certain practical difficulties; that is, either each size of character must be repeated a confusingly number of times, or the pattern has so few choices in the possible positions thereof, that the subject may give correct answers merely by guesswork.

The more common characters, that is, letters of the alphabet, numerals, parallel lines or bars, round dots, checker-board design, etc., are useful in measuring vision when there is no intent to determine the presence or absence of the causes of poor vision, from the recorded measurements.

It may be true that one sufficiently familiar with the characters used can detect the presence of ametropia in many cases, but, in such an event, the ability to do so is more an art than a science, and such method does not lend itself well to rules which may be applied successfully with comparatively little special training.

There has also been employed radiating lines, or parallel lines in groups, the lines of the different groups extending in different directions, in detecting astigmatism and, in conjunction with lenses, in measuring of astigmatism, but when such characters are employed as a means of measuring vision or visual acuity, and of detecting the presence of ametropia from the consideration of such measurements, the objectionable features previously described as associated with the illiterate E, are immediately encountered.

In short, all previously designed characters, etc., do not provide means to distinguish between poor vision due to ametropia, and poor vision due to other cause, in one and the same test procedure, whereas in the present invention poor vision due to ametropia is characterized by different scores in line of a series of only three test characters. Whereas, with poor vision from other causes, in the present invention, the score is substantially the same in the series of three test characters.

One might specifically conclude that the foregoing statement would be true only in so far as the ametropia includes astigmatism, whereas clinical experience has demonstrated that the statement remains true even in the presence of ametropia when astigmatism is negligible.

It has been observed that visual acuity for any given character, letter, or spot, etc., is affected by the nature of the surrounds or background. That is, the more confusing the background, the lower will be the visual acuity for any given character.

The present invention is designed to overcome all of these difficulties and objections by employing means such as a chart, which consists of bars or stripes, preferably parallel, and by placing the parallel stripes or bars preferably in three positions; that is, vertical; 60 degrees from vertical in a clock-wise direction; and 60 degrees from vertical in a contra-clockwise direction, with a spot, which may be either round, square, oblate, or any other suitable shape, between predetermined bars or stripes, and spaced therefrom so that the field or space upon which the dot is displayed will completely surround the dot, the dot being preferably black, or of a suitable color corresponding with the colors of the other stripes or bars, and contrasting from the color of the space in which the dot is placed.

Such an arrangement or chart permits the measurement of visual acuity either by placing the chart at a predetermined distance from the subject's eyes, or by first placing the chart at a distance from the eyes so that the objects thereon cannot at first be recognized, and then gradually reducing this distance until the objects are recognized, but with the addition of being able to detect the presence of ametropia by the differences between the scores (i. e., ability to see the spot between the stripes or bars), according to the direction of the stripes.

With the present invention, in the absence of ametropia, the visual acuity score is essentially the same in all of the above referred to three positions of the stripes.

In carrying out this invention, it is essential that the stripes and spots be of the same color and in sharp contrast to the remainder of the background or field upon which the spot is arranged, and preferably that the stripes be approximately parallel.

It is further preferable, but not essential, that the stripes be equal in width to the distance between parallel stripes, and it is not essential, though it is preferable, that the spot or dot shall be round.

Furthermore, it is preferable, though not essential, that the diameter of the spot shall be of approximately two-thirds of the distance between parallel stripes, and it is preferable, though not essential that there be groups of parallel stripes between which there is no spot.

It has been found that very effective results can be obtained by a group of five circles or discs crossed by parallel stripes, and such an arrangement is most convenient, but several other arrangements of stripe-groups may be employed with equal efficiency and practicability.

The stripe-group arrangement must provide for a variety of dot locations, so that the subject cannot guess the correct location of any indicated spot with any degree of accuracy.

The stripes may be of any desired length, but should preferably be approximately five times as long as they are wide, and to conserve space in the construction of a practical chart, the length of the stripes should not exceed ten times their width.

In the drawing, illustrating several arrangements by means of which this invention may be carried into operation, Fig. 1 shows a plurality of groups of circles or discs, each group comprising a plurality of circles, each circle being crossed by spaced parallel bars or stripes, the bars or stripes of the respective group being at an angle with respect to the vertical, different from that of the next adjacent group, the angle of the bars or stripes of the individual circles of the same group being the same with respect to each other, and with a single dot located in a predetermined and different position in one of the circles of each group.

Fig. 2 is a view of a portion of a chart in which a series of pairs of parallel bars or stripes are provided, one pair, or a plurality of pairs, being vertical, additional pairs being arranged on each side of the vertical pair, or pairs, and at 60 degrees to the vertical.

Fig. 3 is a view of a portion of a chart in which the bars or stripes are arranged to converge from one end toward the opposite end, and with a plurality of spaced dots between the bars.

In the form of the invention shown in Fig. 1, the discs or circles may be of any desired diameter, and each group preferably comprises five discs or circles 10, four of which are uniformly spaced and arranged about a central disc, and in close proximity thereto, the diameters of the discs and circles being uniform.

Spaced bars or stripes 11 extend across each of the discs or circles, and the bars or stripes on the discs or circles of the respective groups are disposed at the same angle to the vertical, the bars or stripes being of uniform width, and the spaces between adjacent bars or stripes are substantially equal to the width of the bars.

However, it is important that the bars or stripes of each group shall be at an angle to the vertical different from that of the bars or stripes of the next adjacent group.

In one of the spaces 12 in one of the discs or circles of each group is arranged a dot 13, and the diameter of this dot is preferably of a length approximately equal to two-thirds of the distance between the bars or stripes between which the dot is arranged, so that a portion of the field comprising the space between the stripes will encircle the dot, and the dot is of a contrasting color from that of the field, but is of the same color as the bars or stripes.

This form of the invention may be effectively employed by the use of only two of the circles or discs 10 arranged adjacent each other and with the stripes or bars running in the same general direction, and with the hot 13 on one of the discs or circles, and with the pairs of discs or circles in the different groups placed in any desired relative position.

If desired, a plurality of these discs or circles may be employed, and their sizes may be gradually reduced to the desired extent, but in each instance the discs or circles of each group are of uniform diameters.

In the arrangement shown in Fig. 2, the bars or stripes 14 are substantially parallel and arranged in pairs, one or more pairs being vertical, while other pairs are arranged on each side of the vertical pair. The additional pairs are arranged at approximately 60 degrees to the vertical, and suitably arranged with respect to the vertical pair or pairs. A dot 15 is provided in the space 16 between the respective pairs of bars 14, and this arrangement of the pairs of bars may be multiplied, and the groups gradually reduced in size.

In Fig. 3, the bars or stripes 17 are of substantial width, and are arranged to converge from one end 18 towards the opposite end 19. A plurality of these converging lines may be employed, with one pair substantially vertical and other pairs on opposite sides of the substantially vertical pairs being inclined to the vertical at approximately 60 degrees. These converging pairs of lines may be arranged so that they will join each other to form an area or space at the point where the converging lines are spaced the greatest distance from each other, as at 20, and in which space is arranged a dot 21.

A plurality of dots 22 are provided between each pair of converging bars 17, and the dot 21 in the space 20 will be common to the other series of dots, and will be of a larger diameter than the dots 22.

The dots 22 are spaced from each other and from the dot 21, and vary in diameter, their size decreasing as they approach the point at which the bars are at the closest proximity to each other.

In this form of the invention, the figures may be multiplied and gradually reduced in sizes to any desired extent, and any desired number of duplications may be employed.

In use with this form of the invention, the dots may be presented to the subject by the operator, indicating them with a pointer, or by the subject himself, stating which ones are visible.

Heretofore, a dot or spot has been employed for measuring visual acuity, but such dot or spot has not been employed between bars or stripes, and assembled in the manner of the present invention, for the purpose of detecting ametropia.

While in the present exemplification of the invention there is shown and described discs or circles upon which the bars or stripes and dots are arranged, it is to be understood that any other shape of field or area in which the bars or stripes and dots are employed may be used with equal efficiency.

The chart may be employed in any desired manner, and different arrangements of the bars or stripes with the accompanying dot may be provided, within the scope of the claims, without departing from the spirit of the invention.

What is claimed as new is:

1. A chart for testing visual acuity, embodying three separated groups of characters, each group comprising a plurality of individual areas of uniform size and shape, each of said areas being provided with spaced stripes, the stripes on one group being upright and those on the other pair of groups being inclined to the vertical, those on one of the groups of said pair being arranged at substantially 60° from the vertical in a clockwise direction, and those on the areas of the other group of said pair being arranged at 60° to the vertical in a counter-clockwise direction, all of said stripes being of a uniform width and all of the spaces between the stripes being also of a uniform width, all of said stripes being of a color sharply contrasting with the color of said spaces, and a dot disposed in a predetermined space in one of said areas of each of said groups, said dot being of the same color as the stripes, and each dot being of a diameter between at least one-half and two-thirds of the width of the respective spaces in which it is located.

2. A chart for testing visual acuity, embodying three adjacent but separated targets, each target embodying spaced stripes of substantial length and width, one target being disposed intermediate the other targets, the stripes on the targets adjacent and on opposite sides of the intermediate target being disposed at different angles to each other, and at substantially the same angle, respectively, clockwise and anti-clockwise with relation to the intermediate stripes, all of the spaces between adjacent stripes being of substantial area, all of said stripes being of a color sharply contrasting with the color of the spaces between the pairs of stripes, and a dot of the same color as the stripes disposed in a predetermined space between adjacent stripes, said dot being of a diameter between at least one-half and two-thirds of the width of the space in which it is located.

3. A chart for testing visual acuity, embodying three separated groups of characters, each group comprising a plurality of individual areas of uniform size and shape, each area being substantially circular, and each group comprising a central area encompassed by four similar areas in close proximity thereto and of substantially the same diameter as the central area, each of said areas being provided with spaced stripes, the stripes on one group being upright and those on the other pair of groups being inclined to the vertical, those on one of the groups of said pair being arranged at substantially 60° from the vertical in a clockwise direction, and those on the areas of the other group of said pair being arranged at 60° to the vertical in a counter-clockwise direction, all of said stripes being of a uniform width and all of the spaces between the stripes being also of a uniform width, all of said stripes being of a color sharply contrasting with the color of said spaces, and a dot disposed in a predetermined space in one of said areas of each of said groups, said dot being of the same color as the stripes, and each dot being of a diameter between at least one-half and two-thirds of the width of the respective spaces in which it is located.

4. A chart for testing visual acuity, embodying three separated groups of characters, each group comprising a plurality of individual areas of uniform size and shape, each of said areas being provided with spaced stripes, the stripes on one group being upright and those on the other pair of groups being inclined to the vertical, those on one of the groups of said pair being arranged at substantially 60° from the vertical in a clockwise direction, and those on the areas of the other group of said pair being arranged at 60° to the vertical in a counter-clockwise direction, all of said stripes being of a uniform width and all of the spaces between the stripes being also of a uniform width, all of said stripes being of a color sharply contrasting with the color of said spaces, and a dot disposed in a predetermined space in one of said areas of each of said groups, said dot being of the same color as the stripes, and each dot being of a diameter between at least one-half and two-thirds of the width of the respective spaces in which it is located, the dot in each area being disposed in different positions with respect to the dots in the other areas.

5. A chart for testing visual acuity, embodying three separated groups of characters, each group comprising a plurality of individual areas of uniform size and shape, each of said areas being provided with spaced stripes, the stripes on one group being upright and those on the other pair of groups being inclined to the vertical, those on one of the groups of said pair being arranged at substantially 60° from the vertical in a clockwise direction, and those on the areas of the other group of said pair being arranged at 60° to the vertical in a counter-clockwise direction, all of said stripes being of a uniform width and all of the spaces between the stripes being also of a uniform width, all of said stripes being of a color sharply contrasting with the color of said spaces, and a dot disposed in a predetermined space in one of said areas of each of said groups, said dot being of the same color as the stripes, and each dot being of a diameter between at least one-half and two-thirds of the width of the respective spaces in which it is located, the position of the stripes of the corresponding areas of the respective groups with relation to the vertical, being different from those of the next adjacent group.

CARL F. SHEPARD.